United States Patent [19]

Kojima et al.

[11] 3,990,990

[45] Nov. 9, 1976

[54] METHOD FOR PREVENTING ADHESION OF RUBBER OR RUBBER-LIKE MATERIAL AND COMPOSITIONS THEREFOR

[75] Inventors: Tatsuo Kojima, Takatsuki; Akinobu Ichihara, Kyoto; Isao Togashi, Higashi; Mikio Koga, Tochigi, all of Japan

[73] Assignees: Dai-Ichi Kogyo Seiyaku Co., Ltd., Kyoto; Bridgestone Tire Company Limited, Tokyo, both of Japan

[22] Filed: May 2, 1975

[21] Appl. No.: 573,831

[52] U.S. Cl. .............................. 252/382; 252/383; 252/384; 106/38.22; 427/400; 428/492; 252/173; 252/529; 252/534; 252/535; 252/539; 252/540; 252/548; 252/553; 252/554; 252/558; 252/559
[51] Int. Cl.² .......................................... C09K 3/00
[58] Field of Search ............ 252/382, 383, 384, 21, 252/540, 559; 427/400; 428/492; 106/38.22

[56] References Cited
UNITED STATES PATENTS

| | | | |
|---|---|---|---|
| 2,658,004 | 11/1953 | Eldridge et al. | 252/21 X |
| 2,992,747 | 7/1961 | Atkeson | 252/383 X |
| 3,116,185 | 12/1963 | Wilson et al. | 252/383 X |
| 3,935,124 | 1/1976 | Thene et al. | 252/382 |

FOREIGN PATENTS OR APPLICATIONS

| | | | |
|---|---|---|---|
| 948,383 | 2/1964 | United Kingdom | 252/559 |
| 949,059 | 2/1964 | United Kingdom | 252/559 |

*Primary Examiner*—Benjamin R. Padgett
*Assistant Examiner*—E. Suzanne Parr
*Attorney, Agent, or Firm*—Armstrong, Nikaido & Wegner

[57] ABSTRACT

A method for preventing adhesion of rubber or rubber-like material to adjacent surfaces comprises treating a surface of rubber or rubber-like material with an aqueous solution of at least one water soluble aromatic compound having at least one $-SO_2-$ group. A surface active agent may be included coexistently in the aqueous solution.

22 Claims, No Drawings

METHOD FOR PREVENTING ADHESION OF RUBBER OR RUBBER-LIKE MATERIAL AND COMPOSITIONS THEREFOR

BACKGROUND OF THE INVENTION

This invention relates to a method for preventing adhesion of rubber or rubber-like material to adjacent surfaces and a composition used for the treating of preventing adhesion of rubber or rubber-like material to adjacent surfaces.

It is known to use an anti-adhering agent for the purpose of preventing to stick unvulcanized rubber sheets to each other when they are stored as piles or rolls after extruding or rolling. Among the known anti-adhering agents there are included powder of inorganic substances such as talc, mica, magnesium carbonate and calcium carbonate and metalic soaps. These materials are usually applied either in the form of powder or in the form of a 15 to 30% aqueous suspention to surfaces of rubber by spraying or dipping. Such the conventional treatments for preventing adhesion of rubber like these are disadvantageous because they usually cause dusting and produce bad working environments.

Some attempts have been made to provide anti-adhesive compositions of silicone resin. However, most of those anti-adhesive compositions of silicone resin degrade the physical properties of rubber though they show a good anti-adhesion affect. In addition, most of those compositions are expensive and accordingly cannot be practically used from the economical point of view.

The principal object of the invention is to provide an improved method for preventing adhesion of rubber or rubber-like material to adjacent surfaces in which the above mentioned disadvantages with use of conventional anti-adhering agents can be avoided.

Another object of the invention is to provide a new and improved anti-adhesive composition for rubber or rubber-like material which is of a non-powder form which never cause dusting and shows a good anti-adhesion effect when applied to surfaces of rubber or rubber-like material.

A further object of the invention is to provide a new and improved anti-adhesive composition for rubber or rubber-like material which does not degrade the physical properties of rubber or rubber-like material.

A still further object of the invention is to provide a new and improved anti-adhesive composition for rubber or rubber-like material which is economically available and can be practically used.

Other objects and advantages of the invention will become apparent from the following detailed description of the invention.

SUMMARY OF THE INVENTION

According to the invention the adhesion of rubber or rubber-like material to adjacent surfaces is prevented by treating at least one surface of rubber or rubber-like material with a composition consisting essentially of an aqueous solution of at least one water soluble aromatic compound having at least one $-SO_2-$ group. Such the water soluble aromatic compound may be selected from the group consisting of:

a. an aromatic sulfonic acid;
b. an alkali, alkaline earth metal, ammonium or organic amine salt of an aromatic sulfonic acid;
c. an alkali, alkaline earth metal, ammonium or organic amine salt of a sulfuric ester of an aromatic compound;
d. a condensation product of an aromatic compound with formaldehyde, said condensation product having at least one sulfonic acid group;
e. an alkali, alkaline earth metal, ammonium or organic amine salt of said (d) condensation product; and
f. an alkali, alkaline earth metal, ammonium or organic amine salt of a condensation product of a sulfuric ester of an aromatic compound with formaldehyde.

The content of said water soluble aromatic compound in said aqueous solution is within the range of 1 to 20% by weight with respect to the total amount of said aqueous solution.

In a preferred embodiment of the invention the composition may further include at least one anionic or nonionic surface active agent in an amount of less than 200% by weight with respect to the amount of said water soluble aromatic compound. The surface tension of a 0.1% (by weight) aqueous solution of the surface active agent should be within the range of 50 dyne/cm to 20 dyne/cm at the temperature of 25° C. Preferably, the amount of said surface active agent is within the range of 10 to 100% by weight with respect to the amount of said water soluble aromatic compound.

The composition may also include water insoluble inorganic powder in an amount of less than 20% by weight with respect to the amount of the water soluble aromatic compound.

DETAILED DESCRIPTION OF THE INVENTION

The composition used for preventing adhesion of rubber or rubber-like material according to the invention consists essentially of an aqueous solution of at least one water soluble aromatic comound having $-SO_2-$ group. The water soluble aromatic compound having $-SO_2-$group may be selected from the group consisting of:

a. an aromatic sulfonic acid;
b. an alkali, alkaline earth metal, ammonium or organic amine salt of an aromatic sulfonic acid;
c. an alkali, alkaline earth metal, ammonium or organic amine salt of a sulfuric ester of an aromatic compound;
d. a condensation product of an aromatic compound with formaldehyde, said condensation product having at least one sulfonic acid group;
e. an alkali, alkaline earth metal, ammonium or organic amine salt of said (d) condensation product; and
f. an alkali, alkaline earth metal, ammonium or organic amine salt of a condensation product of a sulfuric ester of an aromatic compound with formaldehyde.

The aromatic sulfonic acid in the above (a) to (f) may be benzenesulfonic acid, alkylbenzenesulfonic acid having at least one of alkyl group of 1 to 4 carbon atoms, naphthalenesulfonic acid, alkylnaphthalenesulfonic acid having at least one alkyl group of 1 to 3 carbon atoms, naphthalenedisulfonic acid, naphtholsulfonic acid, diphenylsulfonic acid, anthracenesulfonic acid or polystyrenesulfonic acid.

In the above mentioned (c) compound, the sulfuric ester of an aromatic compound may preferably be a member selected from the group consisting of sulfuric ester of alkyleneoxide adducts of phenols and sulfuric ester of alkyleneoxide adducts of naphthols.

The above mentioned (d) condensation product may preferably having an average molecular weight less than about 5000.

In the above mentioned (f) compound, the condensation product of a sulfuric ester of an aromatic composition with formaldehyde has an average molecular weight less than about 5000.

Among the above mentioned (b), (c), (e) and (f) compounds there are included alkali salts such as sodium salts and potassium salts, alkaline earth metal salts such as calcium salts and magnesium salts, ammonium salts and organic amine salts such as monoethanolamine salts, morpholine salts and guanidine salts.

The content of the water soluble aromatic compound component in the aqueous solution should be within the range of 1 to 20% by weight with respect to the total amount of the aqueous solution. If the content of the water soluble aromatic compound in the aqueous solution is less than 1% by weight, the desired effect for preventing adhesion can not be expected. The upper limit of the content of the water soluble aromatic compound will be defined mainly from the economical viewpoint. However, generally speaking, if the content of the water soluble aromatic compound component is larger than 20% by weight, the physical properties of rubber or rubber like material which is treated with the composition according to the invention will be degraded though a good anti-adhesive effect will still be obtained. The most preferable content of the water soluble aromatic compound component in said aqueous solution would be within the range of 1 to 10% by weight with respect to the total amount of said aqueous solution.

The composition used for preventing adhesion of rubber or rubber-like material according to the invention may include at least one anionic or nonionic surface active agent to enhance the wettability of the composition to rubber or rubber like material. The amount of the surface active agent component should be less than 200% by weight, more preferably, 10 to 100% by weight, with respect to the amount of the water soluble aromatic compound component. In addition to this it is required that the surface tension of the 0.1% (by weight) aqueous solution of the surface active agent is within the range of 50 dyne/cm to 20 dyne/cm at the temperature of 25° C.

Among the surface active agents which can be used in the composition of according to the invention there may be included sodium dodecylbenzenesulfonate, potassium lauryl sulfate, sodium dodecane sulfonate, dioctyl sodium sulfosuccinate, monoethanolamine salt of sulfuric ester of lauryl alcohol ethoxide, polyethylene glycol lauryl ether (the average degree of polymerization of ethylene oxide ($\bar{P}$=12), polyethylene glycol nonylphenyl ether ($\bar{P}$=10), polyethylene glycol oleyl ether ($\bar{P}$=10) and lauryl diethanol amide.

The composition used for preventing adhesion of rubber or rubber-like material according to the invention may further include water insoluble inorganic powder component in an amount of less than 20% by weight, more preferably less than 5% by weight, with respect to the amount of said water soluble aromatic compound component. The addition of water insoluble inorganic powder will make treated surfaces of rubber or rubber-like material non-sticky.

The water insoluble inorganic powder may be finely divided powder of talc, mica, calcium carbonate of magnesium carbonate. These water insoluble inorganic powders will never cause dusting because they are well dispersed and suspended in the aqueous solution of a water soluble aromatic compound according to the invention.

The composition for the treatment of preventing adhesion of rubber or rubber-like material can be prepared by dissolving in water at least one of the before mentioned water soluble aromatic compounds (a) to (f) solely or coexistently with the surface active agent component. In case of addition of water insoluble inorganic powder, it may be added to water either before or after the water soluble aromatic compound is dissolved in water.

According to the invention rubber or rubber-like material is treated with the above described composition. The treatment may be carried out as by dipping rubber or rubber-like material in the composition described or coating rubber or rubber-like material with the composition described. The amount of the efficacious component applied to a surface of rubber or rubber-like material is too small to determine it on a dry basis.

The treatment according to the invention can be applied to both natural rubber and synthetic rubber. Among synthetic rubber there are included styrene-butadiene rubber, butadiene rubber, acrylonitrile-butadiene rubber, isobutylene-isoprene rubber, polychloroprene rubber, ethylene-propylene-nonconjugated diene terpolymer rubber. The mixtures of those natural and synthetic rubbers can also be treated with the anti-adhesive composition according to the invention. Typically, unvulcanized rubbers are treated with the composition according to the invention, but vulcanized rubbers and other hydrophobic polymers such as acrylic elastomer, ethylene-vinyl acetate copolymer, polyvinyl acetate, polyvinyl chloride, polyvinyl chloride, polystyrene and polyurethan can also be treated for preventing adhesion with the composition according to the invention.

The anti-adhesive effect obtained by the treatment according to the invention is found both between rubbers or rubber-like materials themselves and between rubbers or rubber-like materials and any other materials such as metals.

PREFERRED EMBODIMENT OF THE INVENTION

The invention will be understood more readily be reference to the following examples; however, these examples are intended to illustrate the invention and are not to be construed to limit the scope of the invention.

In the following examples the amounts of various components and compositions are represented by parts by weight unless otherwise indicated.

1. Preparation of test pieces

Four kinds of test pieces I, II, III and IV having different compositions shown in Table 1 were prepared. Each of the compositions was kneaded by rolls for 5 minutes at a temperature of 60° to 70° C to form a sheet having a thickness of 2mm. Each sheet was cut into test pieces of 25mm × 100mm.

2. Preparing anti-adhesive compositions

1%, 5%, 10% and 20% aqueous solutions or suspensions of various component combinations A to W as indicated in Table 2 were prepared.

3. Treatment for preventing adhesion

The test pieces indicated in Table 1 were dipped for 2 to 3 seconds in the above mentioned various anti-adhesive compositions. After air-drying for 30 minutes, the treated test pieces were subjected to the following adhesion and dusting tests:

a. Adhesion test:

Two same test pieces after an above-mentioned treatment were piled under load of $300g/cm^2$ for 24 hours, and then friction strength was measured by g/cm with autography-tensile testing machine. Pulling speed was 50 mm/min. The test results are indicated in Table 3.

b. Dusting test:

The test pieces after being subjected to the above adhesion test were brushed strongly and measured with the naked dye for the rate of making a dust. The test results are also indicated in Table 3. In Table 3 three different symbols indicate the following results, respectively:

X . . . floating dust was remarkable
Δ . . . floating dust was a few
O . . . floating dust was appreciable

TABLE 1.

| Test Piece No. Components | I | II | III | IV |
|---|---|---|---|---|
| Natural Rubber | 100 | 70 | 50 | 80 |
| Styrene-Butadiene Rubber | — | — | 30 | 20 |
| Butadiene Rubber | — | 30 | 20 | 20 |
| Sulfur | 2 | 2 | 2 | 2 |
| Zinc Oxide | 5 | 5 | 5 | 5 |
| Stearic Acid | 1 | 1 | 1 | 1 |
| HAF Carbon Black | 30 | 30 | 30 | 30 |
| Calcium Carbonate | 20 | 20 | 20 | 20 |

TABLE 2

| | Aromatic Compound | parts by weight | Surface Active Agent | *1 surface tension (dyne/cm) | parts by weight | Inorganic Powder | parts by weight | Other Component | parts by weight |
|---|---|---|---|---|---|---|---|---|---|
| A | Condensation product of sodium butylnaphthalene-sulfonate with formaldehyde ($\overline{M}=960$) | 100 | Potassium sulfuric ester of lauryl-alcohol | 40.8 | 100 | — | | — | |
| B | Sodium salt of condensation product of benzenesulfonic acid with formaldehyde ($\overline{M}=746$) | " | Sodium dioctyl-sulfosuccinate | 32.5 | 80 | — | | — | |
| C | " | " | *2 Block polymer of PPG and PEG ($\overline{M}=2500$) | 55.8 | 80 | — | | — | |
| D | Ammonium salt of condensation product of diphenylether sulfonic acid with formaldehyde ($\overline{M}=1280$) | | — | | | — | | — | |
| E | " | " | Polyethyleneglycol nonylphenyl ether ($\overline{P}=10$) | 29.5 | 5 | — | | — | |
| F | " | " | " | " | 20 | — | | — | |
| G | " | " | " | " | 50 | — | | — | |
| H | " | " | " | " | 100 | — | | — | |
| I | " | " | " | " | 150 | — | | — | |
| J | " | " | " | " | 200 | — | | — | |
| K | " | " | " | " | 300 | — | | — | |
| L | Sodium naphthalenesulfonate | " | Sodium dioctyl sulfosuccinate | 32.5 | 10 | magnesium carbonate | 3 | — | |
| M | Condensation product of methylnaphthalenesulfonic acid with formaldehyde ($\overline{M}=2280$) | " | — | | | — | | — | |
| N | Sodium diphenylether disulfonate | " | — | | | — | | — | |
| O | Ammonium sulfuric ether of α-naphthol ethoxide | " | Lauryl diethanol amide | 27.2 | 10 | — | | — | |
| P | Condensation product of sodium sulfuric ester of butylphenol ethoxide with formaldehyde ($\overline{M}=1265$) | " | — | | | — | | — | |
| Q | Mixture of 40 parts by weight of potassium sulfuric ester of phenol ethoxide and 60 parts by weight of condensation product ($\overline{M}=1180$) of potassium methylnaphthalenesulfonate with formaldehyde | " | — | | | — | | — | |
| R | " | " | Sodium dodecyl-benzenesulfonate | 35.9 | 65 | — | | — | |
| S | Butylnaphthalenesulfonic acid | " | — | | | talc | 10 | monoethanol amine | 25 |
| T | Potassium anthracene disulfonate | " | Polyethyleneglycol nonylphenyl ether ($\overline{P}=10$) | 29.8 | 20 | — | | — | |
| U | Sodium polystyrene | " | — | | | — | | — | |

TABLE 2-continued

| | Aromatic Compound | Surface Active Agent | *1 surface tension (dyne/cm) | parts by weight | Inorganic Powder | parts by weight | Other Component | parts by weight |
|---|---|---|---|---|---|---|---|---|
| | sulfonate ($\overline{M}$=4600) | | | | | | | |
| *3 V | — | | | | calcium carbonate | 100 | — | |
| *3 W | — | | | | potash soap | 100 | — | |

*1 The surface tension is shown of the 0.1% aqueous solution of the surface active agent at the temperature of 25° C.
*2 The block polymer consists of polypropyleneglycol (PPG) and polyethyleneglycol (PEG), and the rate of propylene oxide units to ethylene oxide units is 13:40.
*3 Control

| Example No. | Test Piece | Anti-adhesion composition | Test | \multicolumn{4}{c}{Results - Concentration of anti-adhesion composition} | Blank |
|---|---|---|---|---|---|---|---|---|

| Example No. | Test Piece | Anti-adhesion compo-sition | Test | 1 % | 5 % | 10 % | 20 % | Blank |
|---|---|---|---|---|---|---|---|---|
| 1 | I | A | a | 117 | 43 | 0 | 0 | 1000< |
|   |   |   | b | O 86 | O 31 | O 0 | O 0 | O |
| 2 | II | A | a | 98 | 25 | 0 | 0 | 1000< |
|   |   |   | b | O 106 | O 37 | O 0 | O 0 | O |
| 3 | III | A | a | 106 | 37 | 0 | 0 | 1000< |
|   |   |   | b | O 35 | O 2 | O 0 | O 0 | O |
| 4 | IV | A | a | 35 | 2 | 0 | 0 | 1000< |
|   |   |   | b | O 19 | O 0 | O 0 | O 0 | O |
| 5 | I | B | a | 19 | 0 | 0 | 0 | 1000< |
|   |   |   | b | O 20 | O 4 | O 0 | O 0 | O |
| 6 | II | B | a | 20 | 4 | 0 | 0 | 1000< |
|   |   |   | b | O 45 | O 10 | 0 | 0 | O |
| 7 | III | B | a | 45 | 10 | 0 | 0 | 1000< |
|   |   |   | b | O 760 | O 520 | O 385 | O 150 | O |
| 8 | IV | B | a | 760 | 520 | 385 | 150 | 1000< |
|   |   |   | b | O 97 | O 32 | O 0 | O 0 | O |
| 9 | III | C | a | 97 | 32 | 0 | 0 | 1000< |
|   |   |   | b | O 83 | O 18 | O 0 | O 0 | O |
| 10 | I | D | a | 83 | 18 | 0 | 0 | 1000< |
|   |   |   | b | O 74 | O 13 | O 0 | O 0 | O |
| 11 | I | E | a | 74 | 13 | 0 | 0 | 1000< |
|   |   |   | b | O 75 | O 11 | O 0 | O 0 | O |
| 12 | I | F | a | 75 | 11 | 0 | 0 | 1000< |
|   |   |   | b | O 93 | O 46 | O 3 | O 0 | O |
| 13 | I | G | a | 93 | 46 | 3 | 0 | 1000< |
|   |   |   | b | O 102 | O 51 | O 9 | O 2 | O |
| 14 | I | H | a | 102 | 51 | 9 | 2 | 1000< |
|   |   |   | b | O 148 | O 76 | O 18 | O 7 | O |
| 15 | I | I | a | 148 | 76 | 18 | 7 | 1000< |
|   |   |   | b | O 975 | O 810 | O 683 | O 510 | O |
| 16 | I | J | a | 975 | 810 | 683 | 510 | 1000< |
|   |   |   | b | O 42 | O 1 | O 0 | O 0 | O |
| 17 | I | K | a | 42 | 1 | 0 | 0 | 1000< |
|   |   |   | b | O 20 | O 0 | O 0 | O 0 | O |
| 18 | I | L | a | 20 | 0 | 0 | 0 | 1000< |
|   |   |   | b | O 52 | O 4 | O 0 | O 0 | O |
| 19 | II | L | a | 52 | 4 | 0 | 0 | 1000< |
|   |   |   | b | O 63 | O 10 | O 0 | O 0 | O |
| 20 | III | L | a | 63 | 10 | 0 | 0 | 1000< |
|   |   |   | b | O 96 | O 42 | O 3 | O 1 | O |
| 21 | IV | L | a | 96 | 42 | 3 | 1 | 1000< |
|   |   |   | b | 0 | 0 | 0 | 0 | O |
| 22 | I | M | a | | | | | |
|   |   |   | b | O | O | O | O | O |

-continued

| Example No. | Test Piece | Anti-adhesion composition | Test | Results Concentration of anti-adhesion composition | | | | Blank |
|---|---|---|---|---|---|---|---|---|
| | | | | 1 % | 5 % | 10 % | 20 % | |
| 23 | III | M | a | 75 | 26 | 0 | 0 | 1000< |
| | | | b | O | O | O | O | O |
| 24 | I | N | a | 85 | 31 | 2 | 1 | 1000< |
| | | | b | O | O | O | O | O |
| 25 | III | N | a | 80 | 29 | 0 | 0 | 1000< |
| | | | b | O | O | O | O | O |
| 26 | II | O | a | 49 | 18 | 0 | 0 | 1000< |
| | | | b | O | O | O | O | O |
| 27 | II | P | a | 73 | 29 | 0 | 0 | 1000< |
| | | | b | O | O | O | O | O |
| 28 | I | Q | a | 108 | 41 | 0 | 0 | 1000< |
| | | | b | O | O | O | O | O |
| 29 | II | Q | a | 74 | 32 | 0 | 0 | 1000< |
| | | | b | O | O | O | O | O |
| 30 | I | R | a | 99 | 40 | 0 | 0 | 1000< |
| | | | b | O | O | O | O | O |
| 31 | II | R | a | 68 | 28 | 0 | 0 | 1000< |
| | | | b | O | O | O | O | O |
| 32 | III | S | a | 65 | 22 | 0 | 0 | 1000< |
| | | | b | O | O | O | O | O |
| 33 | IV | S | a | 78 | 30 | 0 | 0 | 1000< |
| | | | b | O | O | O | O | O |
| 34 | II | T | a | 118 | 54 | 8 | 4 | 1000< |
| | | | b | O | O | O | O | O |
| 35 | IV | T | a | 120 | 67 | 10 | 6 | 1000< |
| | | | b | O | O | O | O | O |
| 36 | II | U | a | 93 | 41 | 0 | 0 | 1000< |
| | | | b | O | O | O | O | O |
| 37 | IV | U | a | 99 | 48 | 4 | 0 | 1000< |
| | | | b | O | O | O | O | O |
| 38 | IV | V | a | 83 | 15 | 0 | 0 | 1000< |
| | | | b | Δ | X | X | X | O |
| 39 | IV | W | a | 1000< | 970 | 630 | 580 | 1000< |
| | | | b | O | O | O | O | O |

What we claim is:

1. A method for preventing adhesion of rubber or rubber-like material to adjacent surfaces which comprises treating at least one surface of rubber or rubber-like material with a composition consisting essentially of an aqueous solution containing from 1 to 20% by weight based on the total solution of at least one water soluble aromatic compound selected from the group consisting of:
   a. an aromatic sulfonic acid;
   b. an alkali, alkaline earth metal, ammonium or organic amine salt of an aromatic sulfonic acid;
   c. an alkali, alkaline earth metal, ammonium or organic amine salt of a sulfuric ester of an aromatic compound;
   d. a condensation product of an aromatic compound with formaldehyde, said condensation product having at least one sulfonic acid group;
   e. an alkali, alkaline earth metal, ammonium or organic amine salt of said (d) condensation product; and
   f. an alkali, alkaline earth metal, ammonium or organic amine salt of a condensation product of a sulfuric ester of an aromatic compound with formaldehyde.

2. A method for preventing adhesion as defined in claim 1, wherein said aromatic sulfonic acid is benzenesulfonic acid, alkylbenzenesulfonic acid having at least one alkyl group of 1 to 4 carbon atoms, naphthalenesulfonic acid, alkylnaphthalenesulfonic acid having at least one alkyl group of 2 to 3 carbon atoms, naphthalenedisulfonic acid, naphtholsulfonic acid, diphenylsulfonic acid, anthracenesulfonic acid or polystyrenesulfonic acid.

3. A method for preventing adhesion as defined in claim 1, wherein said sulfuric ester of an aromatic compound is a member selected from the group consisting of sulfuric esters of alkyleneoxide adducts of phenols and sulfuric ester of alkyleneoxide adducts of naphthols.

4. A method for preventing adhesion as defined in claim 1, wherein said (d) condensation product has an average molecular weight less than about 5000.

5. A method for preventing adhesion as defined in claim 1, wherein said condensation product of a sulfuric ester of an aromatic composition with formaldehyde in said (f) compound has an average molecular weight less than about 5000.

6. A method for preventing adhesion as defined in claim 1, wherein the content of said water soluble aromatic compound in said aqueous solution is within the range of 1 to 10% by weight with respect to the total amount of said aqueous solution.

7. A method for preventing adhesion as defined in claim 2, wherein said composition further includes at last one anionic or nonionic surface active agent in an amount of less than 200% by weight with respect to the amount of said water soluble aromatic compound, said surface active agent being selected from the group consisting of sodium dodecylbenzenesulfonate, potassium lauryl sulfate, sodium dodecane sulfonate, dioctyl sodium sulfosuccinate, monoethanolamine salt of sulfuric ester of lauryl alcohol ethoxide, polyethylene glycol lauryl ether, polyethylene glycol nonylphenyl ether, polyethylene glycol oleyl ether and lauryl diethanol amide, and the surface tension of the 0.1% aqueous solution of said surface active agent being within the range of 50 dyne/cm to 20 dyne/cm at the temperature of 25° C.

8. A method for preventing adhesion as defined in claim 7, wherein the amount of said surface active agent is within the range of 10 to 100% by weight with respect to the amount of said water soluble aromatic compound.

9. A method for preventing adhesion as defined in claim 7, in which said composition further includes water insoluble inorganic powder in an amount of less than 20% by weight with respect to the amount of said water soluble aromatic compound.

10. A method for preventing adhesion as defined in claim 9, wherein the amount of said water insoluble inorganic powder is less than 5% by weight with respect to the amount of said water soluble aromatic compound.

11. A method for preventing adhesion as defined in claim 9, wherein said water insoluble inorganic powder is finely divided powder of talc, mica, calcium carbonate or magnesium carbonate.

12. A method for preventing adhesion as defined in claim 1, in which said composition further includes water insoluble inorganic powder in an amount of less than 20% by weight with respect to the amount of said water soluble aromatic compound.

13. A method for preventing adhesion as defined in claim 12, wherein the amount of said water insoluble inorganic powder is less than 5% by weight with respect to the amount of said water soluble aromatic compound.

14. A method for preventing adhesion as defined in claim 12, wherein said water insoluble inorganic powder is finely divided powder of talc, mica, calcium carbonate or magnesium carbonate.

15. A composition for preventing adhesion of rubber or rubber-like material consisting essentially of an aqueous solution containing:
A. at least one water soluble aromatic compound selected from the group consisting of:
a. an aromatic sulfonic acid selected from the group consisting of benzenesulfonic acid, alkylbenzenesulfonic acid having at least one alkyl group of 1 to 4 carbon atoms, naphthalenesulfonic acid, alkylnaphthalenesulfonic acid having at least one alkyl group of 1 to 3 carbon atoms, naphthalenedisulfonic acid, naphtholsulfonic acid, diphenylsulfonic acid, anthracenesulfonic acid and polystyrenesulfonic acid,
b. an alkali, ammonium or organic amine salt of said aromatic sulfonic acid,
c. an alkali, ammonium or organic amine salt of a sulfuric ester of an aromatic compound,
d. a condensation product of an aromatic compound with formaldehyde, said condensation product having at least one sulfonic acid group,
e. an alkali, ammonium or organic amine salt of said (d) condensation product, and
f. an alkali, ammonium or organic amine salt of a condensation product of a sulfuric ester of an aromatic compound with formaldehyde; and
B. at least one anionic or nonionic surface active agent selected from the group consisting of potassium lauryl sulfate, sodium dodecanesulfonate, dioctyl sodium sulfosuccinate, monoethanolamine salt of sulfuric ester of lauryl alcohol ethoxide, polyethylene glycol lauryl ether, polyethylene glycol nonylphenyl ether, polyethylene glycol oleyl ether and lauryl diethanol amide, the surface tension of the 0.1% aqueous solution of said surface active agent being within the range of 50 dyne/cm to 20 dyne/cm at the temperature of 25° C,
the aqueous solution containing said component (A) in an amount of from 1 to 20% by weight based on the total solution and said component (B) in an amount of 10 to 100% by weight with respect to the amount of said component (A).

16. An anti-adhesive composition as defined in claim 15, wherein said sulfuric ester of an aromatic compound is a member selected from the group consisting of sulfuric esters of alkyleneoxide adducts of phenols and sulfuric esters of alkyleneoxide adducts of naphthols.

17. An anti-adhesive compositions as defined in claim 15, wherein said (d) condensation product has an average molecular weight less than about 5000.

18. An anti-adhesive composition as defined in claim 15, wherein said condensation product of a sulfuric ester of an aromatic composition with formaldehyde has an average molecular weight less than about 5000.

19. An anti-adhesive composition as defined in claim 15, wherein the content of said water soluble aromatic compound component in said aqueous solution is within the range of 1 to 10% by weight with respect to the total amount of said aqueous solution.

20. An anti-adhesive composition as define in claim 15, further including water insoluble inorganic powder in an amount of less than 20% by weight with respect to the amount of said water soluble aromatic compound component.

21. An anti-adhesive composition as defined in claim 20, wherein the amount of said water insoluble inorganic powder component is less than 5% by weight with respect to the amount of said water soluble aromatic compound component.

22. An anti-adhesive composition as defined in claim 20, wherein said water insoluble inorganic powder is finely divided powder of talc, mica, calcium carbonate or magnesium carbonate.

* * * * *